US012793650B1

(12) United States Patent
Ito et al.

(10) Patent No.: US 12,793,650 B1
(45) Date of Patent: Nov. 10, 2026

(54) LIGHT EMISSION CONTROL FOR SELF-LUMINOUS DISPLAY DEVICE

(71) Applicant: Synaptics Incorporated, San Jose, CA (US)

(72) Inventors: Daisuke Ito, Tokyo (JP); Takashi Nose, Kanagawa (JP); Hiroshi Takeyama, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 19/220,422

(22) Filed: May 28, 2025

(51) Int. Cl.

| | |
|---|---|
| ***G09G 3/3266*** | (2016.01) |
| ***G09G 3/20*** | (2006.01) |
| ***G09G 3/30*** | (2006.01) |
| ***G09G 3/32*** | (2016.01) |
| ***G09G 3/3208*** | (2016.01) |
| ***G09G 3/3225*** | (2016.01) |

(52) U.S. Cl.
CPC ......... *G09G 3/3266* (2013.01); *G09G 3/2018* (2013.01); *G09G 3/30* (2013.01); *G09G 3/32* (2013.01); *G09G 3/3208* (2013.01); *G09G 3/3225* (2013.01); *G09G 2310/0245* (2013.01); *G09G 2310/0267* (2013.01); *G09G 2320/0233* (2013.01); *G09G 2320/064* (2013.01)

(58) Field of Classification Search
CPC .......... G09G 3/2018; G09G 3/30; G09G 3/32; G09G 3/3208; G09G 3/3225; G09G 3/3266; G09G 2310/0245; G09G 2310/0267; G09G 2320/0233; G09G 2320/064
USPC .......................................................... 345/204
See application file for complete search history.

(56) References Cited

U.S. PATENT DOCUMENTS

| | | | | |
|---|---|---|---|---|
| 11,508,317 | B2 * | 11/2022 | Ha ...................... | G09G 3/3266 |
| 11,854,491 | B2 * | 12/2023 | Hatayama ............ | G09G 3/3275 |
| 12,300,146 | B2 * | 5/2025 | Bae ...................... | G09G 3/2096 |
| 12,333,979 | B2 * | 6/2025 | Bae ...................... | G09G 3/2096 |
| 2014/0118377 | A1 | 5/2014 | Bae et al. | |
| 2020/0286429 | A1 | 9/2020 | Orio et al. | |
| 2021/0020099 | A1 | 1/2021 | Sung et al. | |
| 2022/0068221 | A1 * | 3/2022 | Ha ...................... | G09G 3/3266 |
| 2023/0306913 | A1 * | 9/2023 | Hatayama ............ | G09G 3/3275 |
| 2024/0169936 | A1 | 5/2024 | Jang et al. | |

OTHER PUBLICATIONS

International Search Report, dated Oct. 2, 2026, in International Patent Application No. PCT/US2026/029755, filed May 26, 2026.

* cited by examiner

*Primary Examiner* — Jason M Mandeville
(74) *Attorney, Agent, or Firm* — Leydig, Voit & Mayer, Ltd.

(57) ABSTRACT

A display driver includes control circuitry and panel interface circuitry. The control circuitry is configured to detect a duration of a target frame period or a vertical front porch period of the target frame period and determine, based on the detected duration, a first emission pulse width for a first frame period which occurs after the target frame period. The panel interface circuitry is configured to provide one or more emission pulses of the first emission pulse width to a display panel during the first frame period. The first emission pulse width controls a light emission duty cycle of display elements of the display panel during the first frame period.

20 Claims, 9 Drawing Sheets

LIGHT EMISSION CONTROL FOR SELF-LUMINOUS DISPLAY DEVICE

TECHNICAL FIELD

This disclosure relates generally to display devices and more particularly to light emission control for self-luminous display devices.

BACKGROUND

Self-luminous display devices, such as organic light-emitting diode (OLED) display devices, micro light-emitting diode (μLED) display devices, are widely used as user interfaces for various electronic devices, such as smartphones, head-mounted displays (HMD) (e.g., virtual reality (VR) headsets), televisions, etc., due to their high contrast ratios regardless of the usage environment. Some self-luminous display devices may be configured to adapt to variable refresh rate (VRR) technology, which allows various technical requirements to be met by varying the refresh rate depending on the usage conditions. For example, the refresh rate may be increased to improve image quality when displaying high frame rate video and/or decreased to reduce power consumption when high image quality is not required. While varying the refresh rate may be accomplished by varying the duration of the frame period, this may cause undesirable changes in the brightness level of the image displayed on the self-luminous display device because the brightness level depends on the light emission duty cycle, which is the ratio of the light emission duration during the frame period to the duration of the frame period.

SUMMARY

This summary is provided to introduce, in a simplified form, a selection of concepts that are further described below. This summary is not necessarily intended to identify key features or essential features of the present disclosure. The present disclosure may include the following various aspects and embodiments.

In one aspect, a display driver includes control circuitry and panel interface circuitry. The control circuitry is configured to detect a duration of a target frame period or a vertical front porch period of the target frame period, and determine, based on the detected duration, a first emission pulse width for a first frame period which occurs after the target frame period. The panel interface circuitry is configured to provide one or more emission pulses of the first emission pulse width to a display panel during the first frame period. The first emission pulse width controls a light emission duty cycle of display elements of the display panel during the first frame period.

In another aspect, a display device includes a display panel and a display driver. The display driver is configured to detect a duration of a target frame period or a vertical front porch period of the target frame period, and determine, based on the detected duration, a first emission pulse width for a first frame period which occurs after the target frame period. The display driver is further configured to provide one or more emission pulses of the first emission pulse width to a display panel during the first frame period. The first emission pulse width controls a light emission duty cycle of display elements of the display panel during the first frame period.

In yet another aspect, a method includes detecting, by a display driver configured to drive a display panel, a duration of a target frame period or a vertical front porch period of the target frame period. The method further includes determining, by the display driver, a first emission pulse width for a first frame period which occurs after the target frame period based on the detected duration. The method further includes providing, by the display driver, one or more emission pulses of the first emission pulse width to the display panel during the first frame period. The first emission pulse width controls a light emission duty cycle of display elements of a display panel during the first frame period.

Other features and aspects are described in more detail below with reference to the attached drawings.

Figure 1:
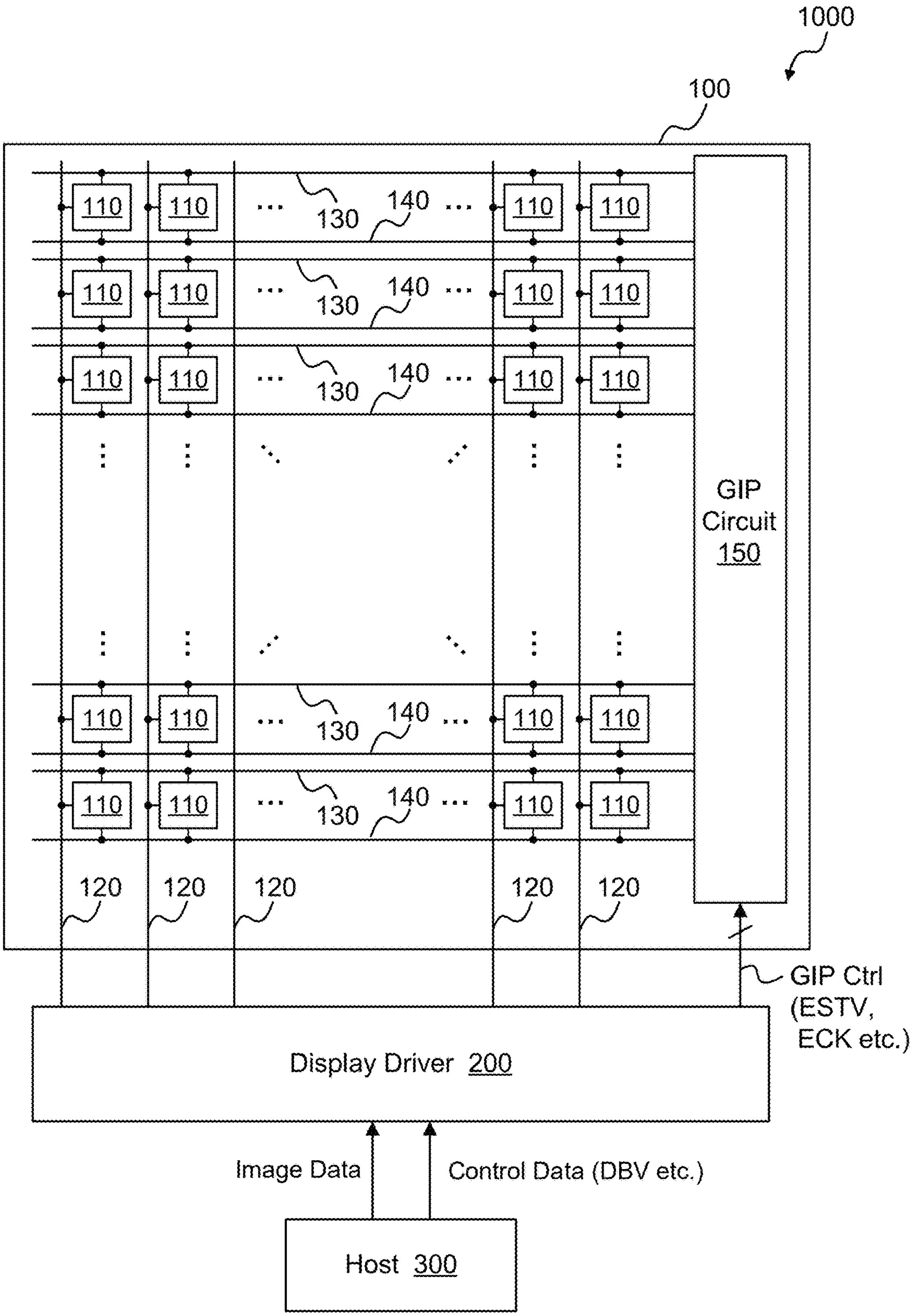
FIG. 1 shows an example configuration of a display device, according to one or more embodiments.

For ease of understanding, where possible, identical reference numerals have been used to designate elements that are common to the figures. It is contemplated that elements disclosed in one embodiment may be utilized in other embodiments without specific recitation. Suffixes may be appended to reference numerals to distinguish elements from one another. The drawings referenced herein are not to be construed as being drawn to scale unless specifically noted. In addition, the drawings are often simplified and details or components are omitted for clarity of presentation and explanation. The drawings and discussion serve to explain the principles discussed below.

DETAILED DESCRIPTION

The following detailed description is exemplary in nature and is not intended to limit the disclosure or the applications and uses of the disclosure. Further, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term “coupled” as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Self-luminous display devices are widely used as user interfaces for various electronic devices, such as smartphones, head-mounted displays (HMD) (e.g., virtual reality (VR) headsets), televisions, etc., due to their high contrast ratios regardless of the usage environment. A self-luminous display device may be formed by an array of display elements, each of which includes a light-emitting element, such as an organic light-emitting diode (OLED), a micro light-emitting diode (μLED), etc.

To enhance the user experience, it may be desired to adjust the display brightness level of a self-luminous display device according to the usage environment and/or user preferences. The display brightness level referred to herein is the overall brightness level of the displayed image. For example, in a bright usage environment, the display brightness level may be increased to improve the visibility of the displayed image. The display brightness level of a self-luminous display device may be adjusted by the light emission duty cycle (or light emission duty ratio) of the display elements. The light emission duty cycle referred to herein is the ratio or fraction of the light emission duration of the display elements during the frame period to the duration of the frame period. For example, if the respective display elements emit light for 20% of each frame period, the light emission duty cycle is 20%. The minimum light emission duty cycle (e.g., 0%) corresponds to the minimum display brightness level, while the maximum light emission duty cycle (e.g., 90%) corresponds to the maximum display brightness level. The display brightness level can be increased by increasing the light emission duty cycle.

Some self-luminous display devices may be configured to adapt to variable refresh rate (VRR) technology, which allows various technical requirements to be met by varying the refresh rate based on usage conditions. For example, the refresh rate may be increased to improve image quality when displaying high frame rate video and/or decreased to reduce power consumption when high image quality is not required. In some implementations, the refresh rate may be adjusted by varying the duration of the frame period. However, this may cause undesirable changes in the display brightness level because the display brightness level of a self-luminous display device depends on the light emission duty cycle, which may vary when the duration of the frame period is changed.

The present disclosure provides various techniques for avoiding or mitigating undesirable changes in the display brightness level when the refresh rate is changed. In one or more embodiments, a display driver is configured to detect a duration of a target frame period or a vertical front porch period of the target frame period and automatically control the light emission duty cycle based on the detected duration. More specifically, a display driver of one or more embodiments may include control circuitry and panel interface circuitry. The control circuitry may be configured to detect a duration of a target frame period or a vertical front porch period of the target frame period and determine a first emission pulse width for a first frame period that occurs after the target frame period based on the detected duration, wherein the first emission pulse width controls a light emission duty cycle of light emitting elements of the display panel during the first frame period. The panel interface circuitry may be configured to provide one or more emission pulses of the first emission pulse width to a display panel during the first frame period. The following is a detailed description of embodiments of the present disclosure.

FIG. 1 shows an example configuration of a display device 1000, according to one or more embodiments. In the shown embodiment, the display device 1000 includes a display panel 100 and a display driver 200. The display panel 100 is a self-luminous display panel such as an organic light emitting diode (OLED) display panel and a micro light emitting diode (μLED) display panel. The display device 1000 is configured to display an image on the display panel 100 based on image data received from a host 300. Examples of the host 300 include processors such as application processors and central processing units (CPUs), controllers such as microcontrollers (MCUs), or other devices suitable for providing the image data.

In the shown embodiment, the display panel 100 includes display elements 110, a set of data lines 120 (also referred to as source lines), a set of gate lines 130, a set of emission lines 140, and a gate-in-panel (GIP) circuit 150. The data lines 120 are coupled to the display driver 200, while the gate lines 130 and the emission lines 140 are coupled to the GIP circuit 150. Each row of display elements 110 is coupled to a corresponding gate line 130 and a corresponding emission line 140, while each column of display elements 110 is coupled to a corresponding data line 120. Each display element 110 is configured to be updated or programmed with a data voltage received from the display driver 200, and to emit light with a luminance level corresponding to the data voltage. In embodiments where the display panel 100 is an OLED display panel, each display element 110 includes an OLED element configured to emit light according to the data voltage. In one or more embodiments, updating or programming a display element 110 with a data voltage is accomplished by asserting the gate line 130 coupled to the display element 110 while the display driver 200 drives the data voltage onto the data line 120 coupled to the display element 110.

The GIP circuit 150 is configured to scan the gate lines 130 to control the updating or programming of the display elements 110 of the respective rows. In one implementation, the GIP circuit 150 is configured to sequentially assert the gate lines 114 to sequentially enable updating or programming of the display elements 110 of the respective rows with data voltage generated by the display driver 200. Scanning of the gate lines 130 may be controlled by a first subset of GIP control signals received from the display driver 200. In one implementation, the first subset of GIP control signals may include a gate scan start pulse signal and an emission scan clock for controlling the scanning of the gate lines 130.

The GIP circuit 150 is further configured to scan the emission lines 140 to control the light emission of the display elements 110 of respective rows. In one implementation, the GIP circuit 150 may be configured to, when allowing display elements 110 of a particular row to emit light, assert the emission line 140 coupled to the display elements 110 of that row. The GIP circuit 150 may further be configured to, when prohibiting display elements 110 of a particular row from emitting light, deassert the emission line 140 coupled to the display elements 110 of that row. Scanning of the emission lines 140 may be controlled by a second subset of GIP control signals received from the display driver 200. In one implementation, the second set of GIP control signals may include an emission scan start pulse signal ESTV and an emission scan clock ECK for controlling the scanning of the emission lines 140.

The display driver 200 is configured to update the display elements 110 based on image data received from the host 300. In one implementation, the image data may include gray levels of the respective display elements 110. The display driver 200 may be configured to generate data voltages corresponding to the gray levels of the respective display elements 110, and to update or program the display elements 110 with the generated data voltages over the data lines 120.

The display driver 200 is further configured to control the overall operation of the display device 1000 based on control data received from the host 300. In one implementation, the display driver 200 is configured to provide timing control of the display device 1000, including generating a horizontal synchronization signal and a vertical synchronization signal based on the control data. The display driver 200 may be configured to generate the GIP control signals in synchronization with the horizontal synchronization signal and the vertical synchronization signal to control the scanning of the gate lines 130 and the emission lines 140. As described above, the GIP control signals may include a gate scan start pulse signal and a gate scan clock to control the scanning of the gate lines 130. The GIP control signals generated by the display driver 200 may further include an emission scan start pulse signal ESTV and an emission scan clock ECK to control the scanning of the emission lines 140.

The display driver 200 is further configured to control the display brightness level of the display device 1000 based on the control data. The display brightness level, as referred to herein, may be the overall brightness level of the image displayed on the display panel 100. In one implementation, controlling the display brightness level may be accomplished by controlling the light emission duty cycle of the display elements 110 based on the control data. The light emission duty cycle, as referred to herein, is the ratio of the duration of the period during which the display elements 110 emit light during the frame period to the duration of the frame period. In one implementation, the control data may include a display brightness value (DBV) that specifies the desired value of the display brightness level, and the display driver 200 is configured to control the display brightness level of the display device 1000 by controlling the light emission duty cycle based on the DBV. In one implementation, the DBV may be generated by the host 300 based on a user input to an input device (e.g., a touch panel provided on the display panel 100) coupled to the host 300. For example, when a command to increase the display brightness level is manually input to the input device, the host 300 may generate an increased DBV, and the display driver 200 may increase the light emission duty cycle of the display elements 110 in response to the increased DBV.

Figure 2:
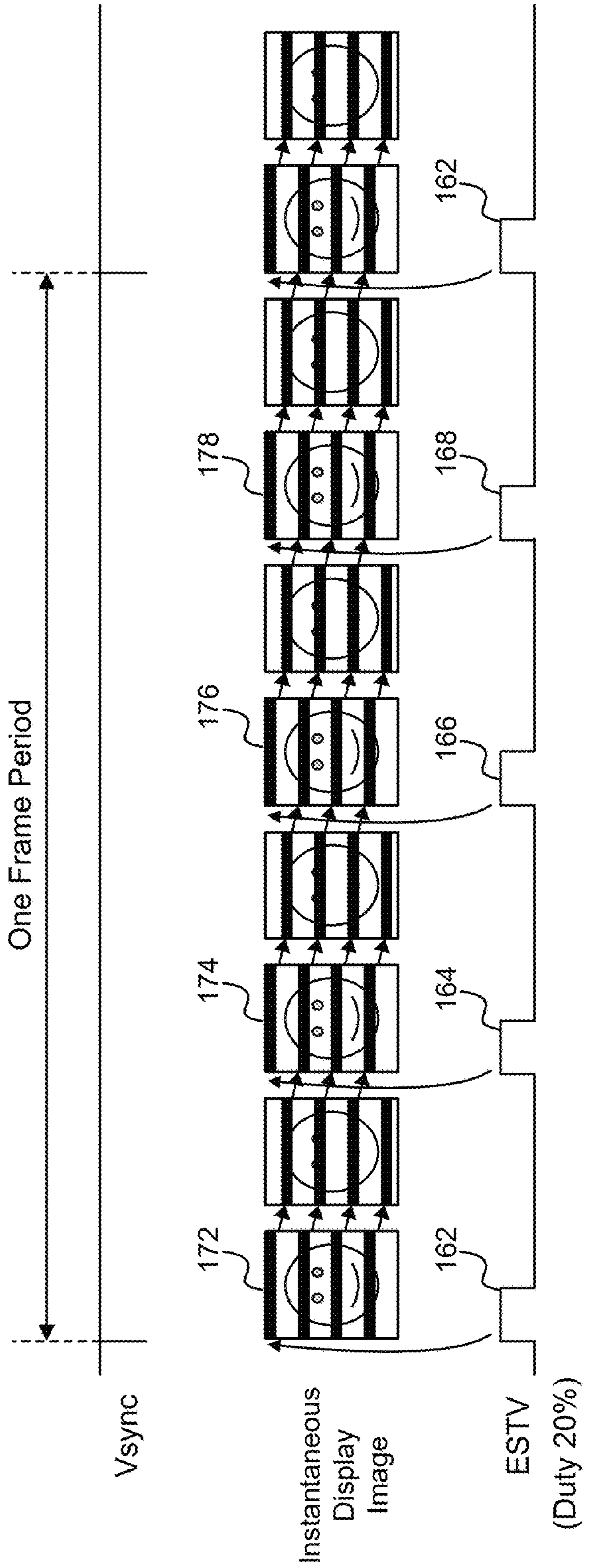
FIG. 2 shows an example of controlling the display brightness level, according to one or more embodiments.

FIG. 2 shows an example of controlling the display brightness level by the emission scan start pulse signal ESTV, according to one or more embodiments. Shown in FIG. 2 are examples of the waveform of the vertical synchronization signal Vsync, changes in the instantaneous display image over time, and the waveform of the emission scan start pulse signal ESTV. In one or more embodiments, the display driver 200 is configured to control the light emission duty cycle of the display elements 110 of the display panel 100 using the emission scan start pulse signal ESTV to control the display brightness level of the display device 1000. The emission scan start pulse signal ESTV includes emission pulses designated by numerals 162, 164, 166, and 168 in FIG. 2. In the shown embodiment, the emission scan start pulse signal ESTV includes four emission pulses 162, 164, 166, and 168 for each frame period. The emission pulses 162, 164, 166, and 168 control the start timing of scanning the emission lines 140 and also control the light emission duty cycle of the display elements 110.

The GIP circuit 150 is configured to start scanning the emission lines 140 in response to the occurrence of the emission pulses 162, 164, 166, and 168 while controlling the light emission duty cycle of the display elements 110 in response to the pulse width of the emission pulses 162, 164, 166, and 168. More specifically, the GIP circuit 150 is configured to scan the emission lines 140 such that the instantaneous display image displayed on the display panel 100 includes one or more non-light emitting regions, which are indicated by black horizontal stripes in FIG. 2. The non-light emitting regions correspond to a set of rows of the display elements 110 that do not emit light, and the GIP circuit 150 is configured to deassert a set of emission lines 140 corresponding to the non-light emitting rows of the display elements 110. As the emission lines 140 are scanned, the deasserted set of deasserted emission lines 140 is shifted in the vertical direction (the downward direction in FIG. 2) of the display panel 100, and correspondingly, the non-light emitting rows of the display elements 110 are shifted in the vertical direction. Meanwhile, the GIP circuit 150 is configured to deassert one or more emission lines 140 at the top of the display panel 100 during the periods during which the emission pulses 162, 164, 166, and 168 appear on the emission scan start pulse signal ESTV. This results in non-light emitting regions having a vertical width corresponding to the pulse width of the emission pulses 162, 164, 166, and 168 appearing successively at the top of the display panel 100 and then being scrolled or shifted toward the bottom of the display panel 100 over time. In FIG. 2, the non-light emitting regions 172, 174, 176, and 178 appear at the top of the display panel 100 while the emission pulses 162, 164, 166, and 168 occur on the emission scan start pulse signal ESTV.

In the operation shown in FIG. 2, the light emission duty cycle of the respective display elements 110 is controlled by the pulse width of the emission pulses 162, 164, 166, and 168 on the emission scan start pulse signal ESTV. The pulse width of the emission pulses 162, 164, 166, and 168 may be referred to herein simply as the emission pulse width. It should be noted that the light emission duty cycle is a function of both of the pulse width of the emission pulses 162, 164, 166, and 168 and the duration of the frame period. In one implementation, the light emission duty cycle is the ratio of the duration during which no emission pulses occur on the emission scan start pulse signal ESTV to the total duration of the frame period.

Figure 3:
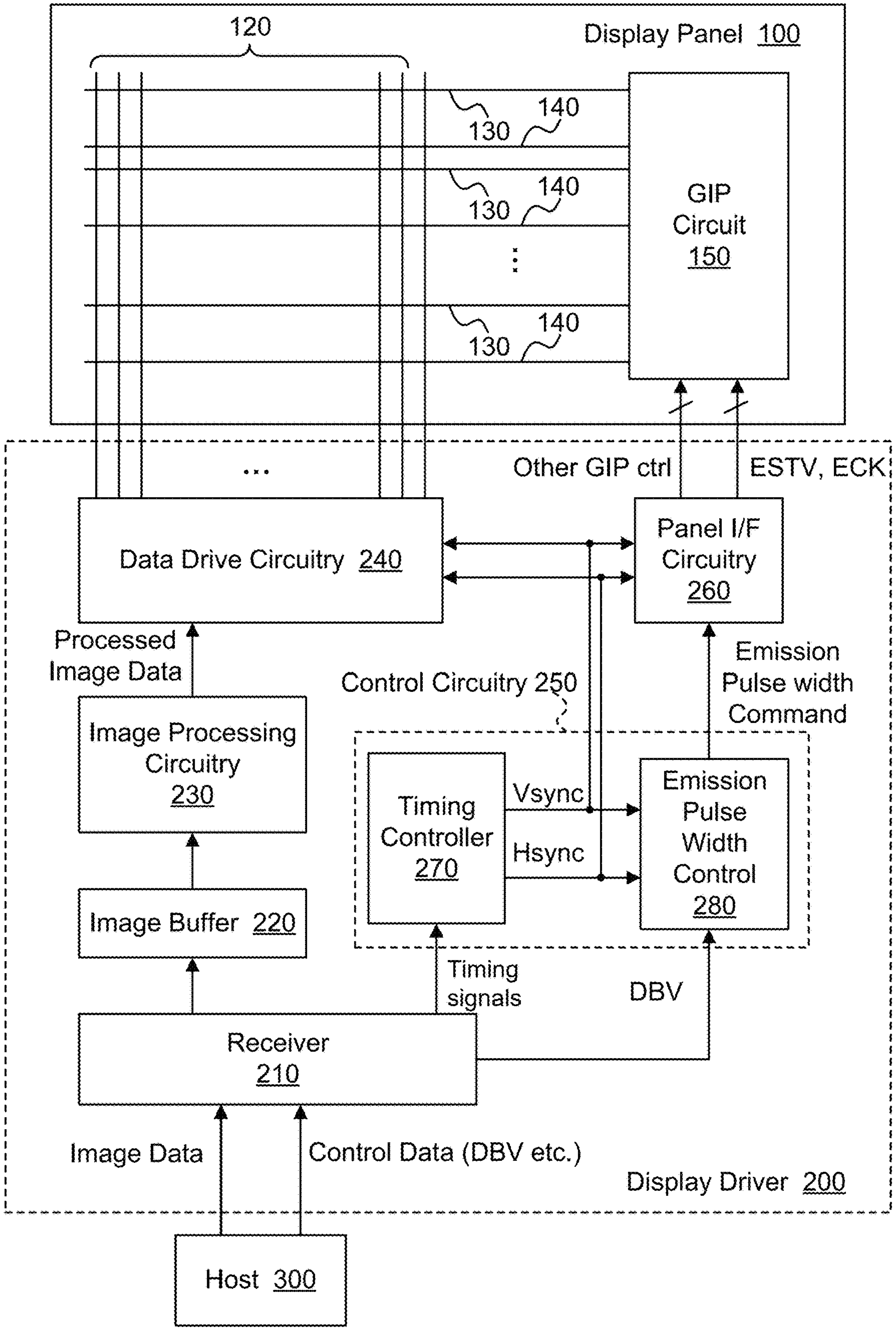
FIG. 3 shows an example configuration of a display driver, according to one or more embodiments.

FIG. 3 shows an example configuration of the display driver 200, according to one or more embodiments. In the shown embodiment, the display driver 200 includes a receiver 210, an image buffer 220, image processing circuitry 230, data drive circuitry 240, control circuitry 250, and panel interface (I/F) circuitry 260. The display driver 200 may be configured as a display driver integrated circuit (DDIC) that monolithically integrates the receiver 210, the image buffer 220, the image processing circuitry 230, the data drive circuitry 240, the control circuitry 250, and the panel interface (I/F) circuitry 260 into a single semiconductor chip.

The receiver 210 is configured to receive the image data from the host 300 and forward the image data to the image buffer 220. The receiver 210 is further configured to extract timing information from the control data and provide one or more timing signals to the control circuitry 250 based on the timing information. In one implementation, the control data may include bits that indicate the start timing of line periods (also referred to as horizontal synchronization periods) and frame periods (also referred to as vertical synchronization periods), and the receiver 210 may be further configured to generate the one or more timing signals based on the control data. The receiver 210 may be further configured to extract the DBV from the control data and provide the DBV to the control circuitry 250.

The image buffer 220 is configured to temporarily store the image data received from the receiver 210 and provide the stored image data to the image processing circuitry 230. The image processing circuitry 230 is configured to process the image data received from the image buffer 220 and provide the processed image data to the data drive circuitry 240. The data drive circuitry 240 is configured to drive or update the display elements 110 based on the processed image data.

The control circuitry 250 is configured to control the overall operation of the display driver 200. In the shown embodiment, the control circuitry 250 includes a timing controller 270 and an emission pulse width control circuit 280. The timing controller 270 is configured to generate a vertical synchronization signal Vsync and a horizontal synchronization signal Hsync based on the timing signals received from the receiver 210. The vertical synchronization signal Vsync defines frame periods (also referred to as vertical synchronization periods), while the horizontal synchronization signal Hsync defines line periods (also referred to as horizontal synchronization periods). Each frame period may be defined as the period between successive assertions of the vertical synchronization signal Vsync, while each line period may be defined as the period between successive assertions of the horizontal synchronization signal Hsync. The vertical synchronization signal Vsync and the horizontal synchronization signal Hsync may be provided to the data drive circuitry 240 and the panel interface circuitry 260 to achieve timing control. In one implementation, the vertical synchronization signal Vsync and the horizontal synchronization signal Hsync may control the generation timing of the data voltages to be provided by the data drive circuitry 240 to the display elements 110 of the display panel 100, and may also control the generation timing of the emission pulses in the emission scan start pulse signal ESTV by the panel interface circuitry 260.

The emission pulse width control circuit 280 is configured to receive the DBV from the receiver 210 and to generate an emission pulse width command based on the DBV. The emission pulse width command may indicate the desired value of the emission pulse width, i.e., the desired pulse width of the emission pulses on the emission scan start pulse signal ESTV. As described in detail later, the emission pulse width control circuit 280 may be configured to detect the duration of each frame period or the duration of the vertical front porch period of each frame period based on the vertical synchronization signal Vsync and the horizontal synchronization signal Hsync, and to adjust the emission pulse width based on the detected duration. Since the emission pulse width controls the light emission duty cycle of the display elements 110 as discussed above, generating the emission pulse width based on the DBV allows the light emission duty cycle to be controlled to adjust the display brightness level as indicated by the DBV.

The panel interface circuitry 260 is configured to generate the GIP control signals based on the vertical synchronization signal Vsync, the horizontal synchronization signal Hsync, and the emission pulse width command and to provide the GIP control signals to the GIP circuit 150 of the display panel 100. Specifically, the panel interface circuitry 260 is configured to generate the emission scan start pulse signal ESTV such that the emission pulses on the emission scan start pulse signal ESTV have the pulse width indicated by the emission pulse command. Received from the control circuitry 250.

Figure 4:
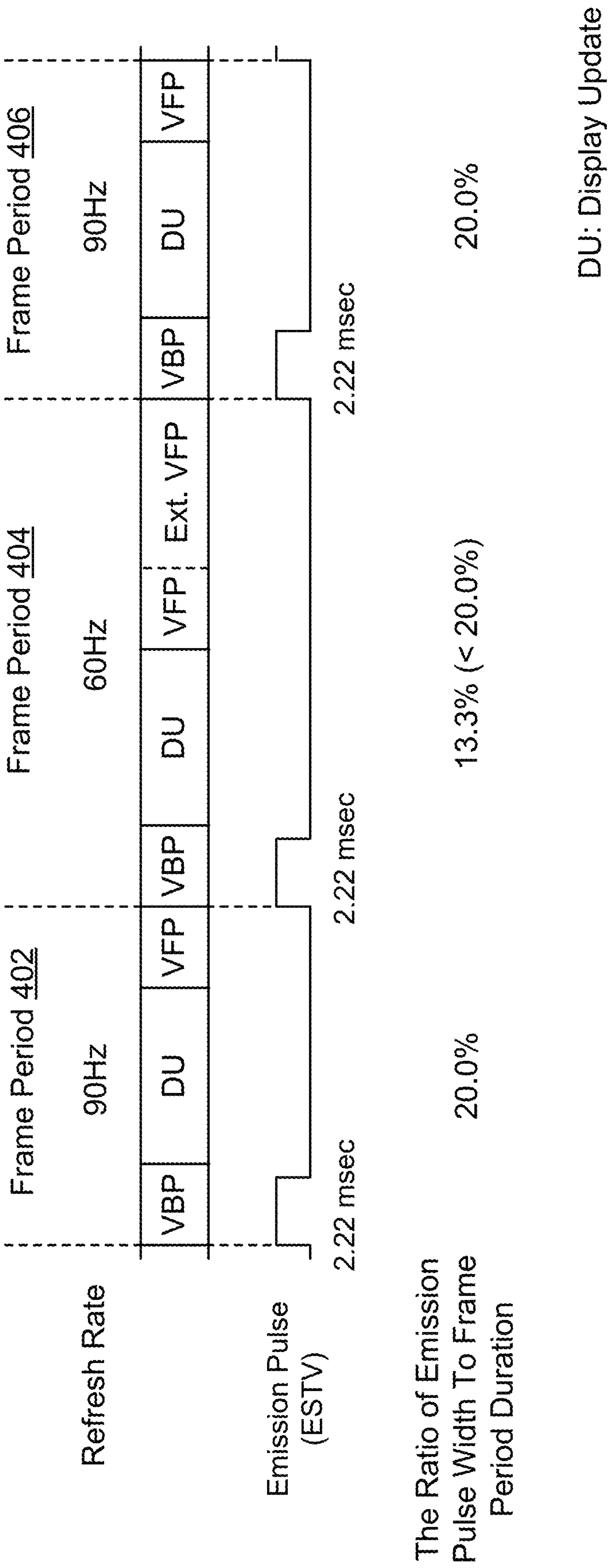
FIG. 4 shows an example operation of changing the refresh rate of a display device.

FIG. 4 shows an example operation of changing the refresh rate of the display device 1000 by varying the durations of frame periods 402, 404, and 406. For simplicity, FIG. 4 shows that one emission pulse occurs during each of the frame periods 402, 404, and 406. However, it should be noted that two or more emission pulses may occur during each of the frame periods 402, 404, and 406. Each of the frame periods 402, 404, and 406 includes a vertical back porch (VBP) period, a display update (DU) period, and a vertical front porch (VFP) period. The display update period is the period during which the display driver 200 updates the display elements 110 of the display panel 100 with the data voltages, and the VBP and VFP periods are blanking periods during which the display driver 200 performs preparation for updating the display elements 110 during the display update period. The refresh rate is 90 Hz during the frame period 402, and the refresh rate is switched to 60 Hz in the frame period 404 by extending the duration of the frame period 404. In the shown embodiment, the duration of the frame period 404 is extended by extending the VFP period. The extended portion of the VFP period is referred to as the extended VFP period and is designated by “Ext. VFP” in FIG. 4. The refresh rate is then returned to 90 Hz in the frame period 406.

In the example shown in FIG. 4, the duration of the frame period 404 is different from the duration of the frame periods 402 and 406, while the emission pulse width on the emission scan start pulse signal ESTV remain unchanged. Since the light emission duty cycle is a function of both of the emission pulse width and the frame period duration, the change in the frame period duration may cause a change in the light emission duty cycle, resulting in an undesired change in the display brightness level.

Figure 5:
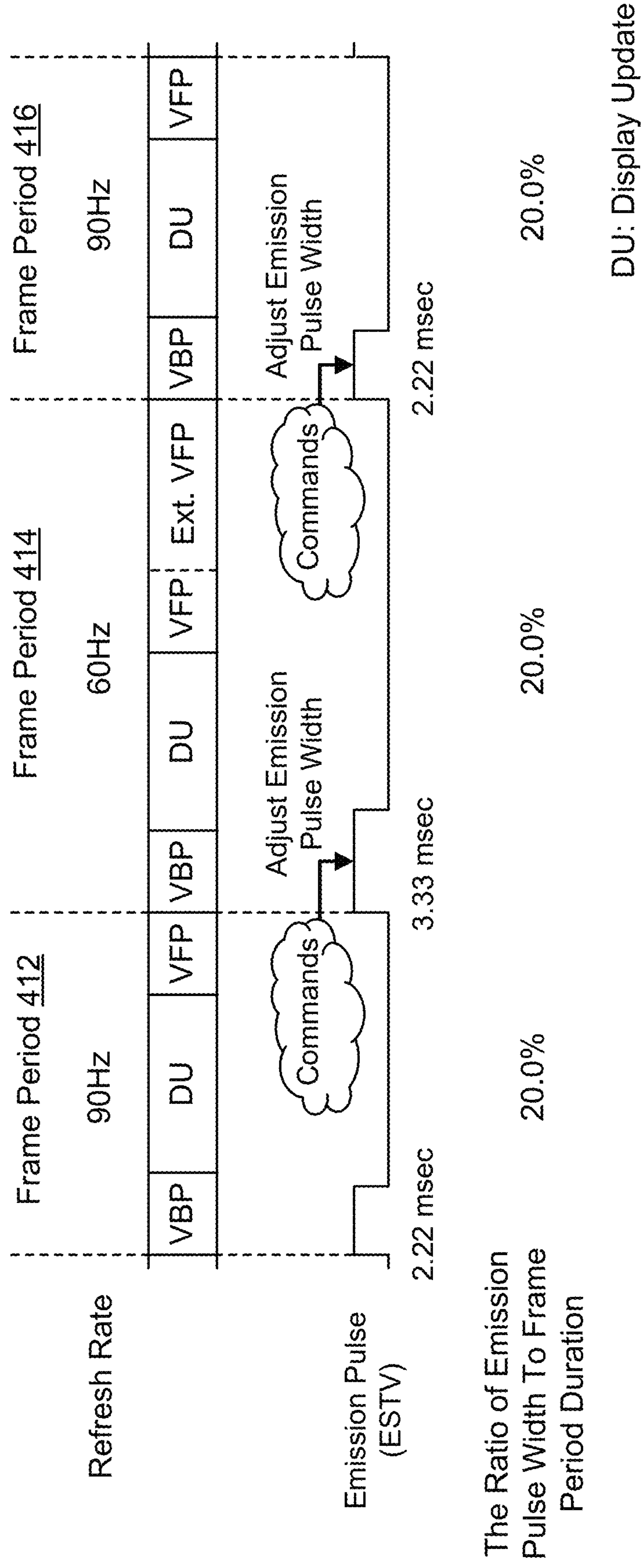
FIG. 5 shows an example operation of adjusting the width of emission pulses for a display device.

Referring to FIG. 5, a possible approach to avoid an undesired change in the display brightness level potentially caused by a change in the light emission duty cycle is for the host 300 (shown in FIG. 1) to send commands to adjust the emission pulse width in synchronization with the change in the frame period duration or the VFP period. However, this may undesirably increase the effort imposed on the user of the display device 1000 to program the host 300, because in actual implementations an increased number of registers in the display driver 200 may be involved to adjust the emission pulse width and long commands may be required to adjust the emission pulse width.

To address this issue, the display driver 200 is configured to automatically adjust the emission pulse width in response to changes in the refresh rate without relying on commands received from the host 300. In one or more embodiments, the display driver 200 may be configured to detect the duration of each frame period or the duration of the vertical front porch period of each frame period. The display driver 200 is further configured to determine, based on the detected duration, the emission pulse width for a future frame period that occurs after this frame period. It is noted that the emission pulse width controls the light emission duty cycle of the display elements 110 of the display panel 100. The display driver 200 is further configured to provide one or more emission pulses of the determined emission pulse width to the GIP circuit 150 of the display panel 100 during the future frame period.

Figure 6:
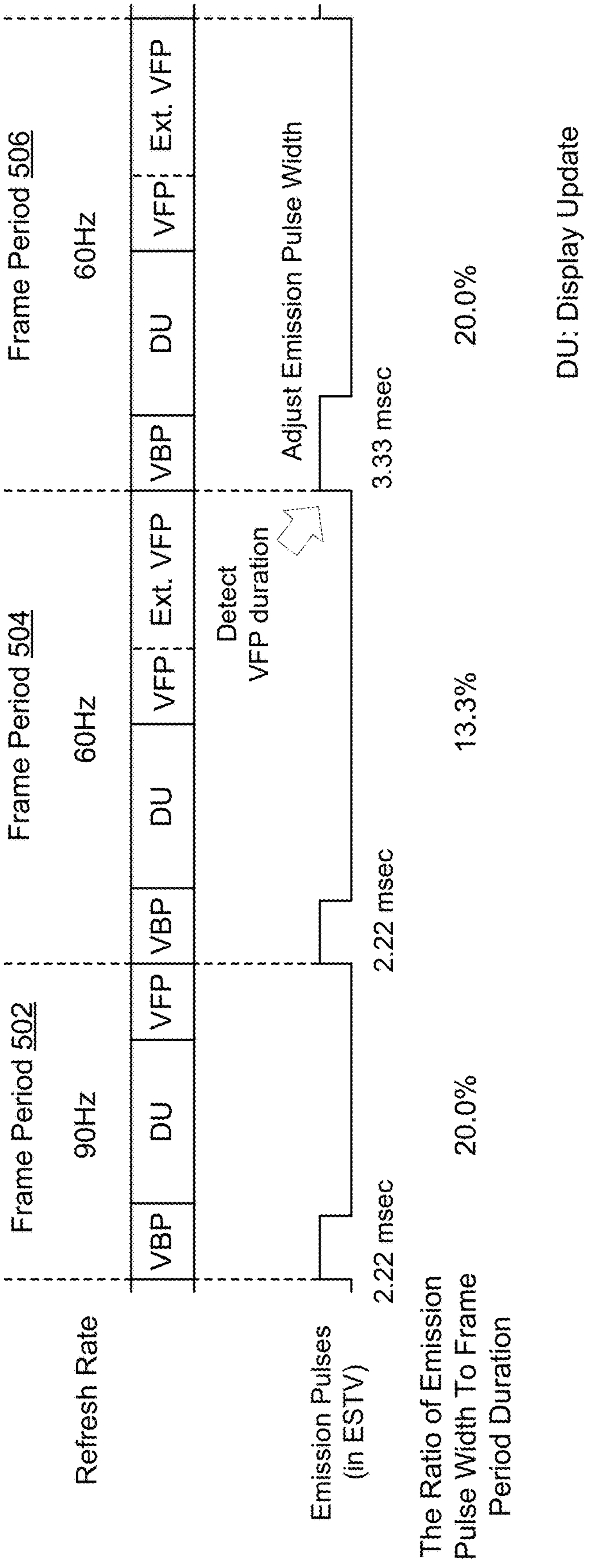
FIG. 6 shows an example of the operation of a display driver, according to one or more embodiments.

FIG. 6 shows an example of the operation of the display driver 200 during frame periods 502, 504, and 506, according to one or more embodiments. For simplicity, FIG. 6 shows that one emission pulse occurs during each of the frame periods 502, 504, and 506. It should be noted however that two or more emission pulses may occur on the emission scan start pulse signal ESTV during each frame period. The refresh rate is 90 Hz during the frame period 502, and the refresh rate is switched to 60 Hz in the frame period 504 by extending the duration of the frame period 504. In the shown embodiment, the duration of the frame period 504 is extended by extending the VFP period. The refresh rate is maintained at 60 Hz during the frame period 506 following the frame period 504.

In one or more embodiments, the control circuitry 250 of the display driver 200 (shown in FIG. 3) may be configured to detect the duration of the VFP period of the frame period 504. In one implementation, the emission pulse width control circuit 280 of the control circuitry 250 may be configured to count the number of the line periods of the VFP period of the frame period 504 based on the horizontal synchronization signal Hsync received from the timing controller 270, and to detect the duration of the VFP period in terms of the number of the line periods of the VFP period.

The control circuitry 250 may further be configured to determine the emission pulse width for the frame period 506 based on the detected duration of the VFP period of the frame period 504, and the panel interface circuitry 260 may be configured to generate the emission scan start pulse signal ESTV such that the emission pulse on the emission scan start pulse signal ESTV has the determined emission pulse width during the frame period 506. In one or more embodiments, to mitigate an undesired change in the display brightness level, the emission pulse width for the frame period 506 may be determined such that the light emission duty cycle during the frame period 506 is equal to the light emission duty cycle during the frame period 502, which occurs prior to the change in the frame period duration. This may be accomplished by determining the emission pulse width for the frame period 506 such that the ratio of the emission pulse width to the frame period duration is unchanged between the frame periods 502 and 506. In the embodiment shown in FIG. 6, where the refresh rates during the frame periods 502 and 506 are 90 Hz and 60 Hz, respectively, and the emission pulse width during the frame period 502 may be 2.22 msec, the emission pulse width for the frame period 506 may be determined to be 3.33 msec such that the light emission duty cycle during the frame period 506 is equal to the light emission duty cycle during the frame period 502. It is noted that the light emission duty cycle during the frame period 504 may be inappropriate because the emission pulse width for the frame period 504 is maintained equal to the emission pulse width for the frame period 502. However, those skilled in the art would appreciate that this does not have a significant effect on the display brightness level because the inappropriate state of the light emission duty cycle lasts for only one frame period.

In other embodiments, the control circuitry 250 of the display driver 200 (shown in FIG. 3) may be configured to detect the duration of the frame period 504 instead of the duration of the duration of the VFP period of the frame period 504. In one implementation, the emission pulse width control circuit 280 of the control circuitry 250 may be configured to count the number of the line periods of the frame period 504 based on the horizontal synchronization signal Hsync received from the timing controller 270, and to detect the duration of the frame period 504 in terms of the number of the line periods of the frame period 504. The control circuitry 250 may further be configured to determine the emission pulse width for the frame period 506 based on the detected duration of the frame period 504, and the panel interface circuitry 260 is configured to generate the emission scan start pulse signal ESTV such that the emission pulse on the emission scan start pulse signal ESTV has the determined emission pulse width during the frame period 506.

In alternative embodiments, the frame period duration may be adjusted by adjusting the duration of the line periods (also referred to as horizontal synchronization periods) of each frame period. For example, when the refresh rate is to be reduced from a particular frame period, the duration of that frame period and subsequent frame periods may be increased from before that frame period by increasing the duration of the line periods of those frame periods. In one implementation, the duration of the line periods may be adjusted by the assertion timing of the vertical synchronization signal Vsync and the horizontal synchronization signal Hsync. The horizontal synchronization signal Hsync may be generated such that the time intervals between successive assertions of the horizontal synchronization signal Hsync coincide with the desired duration of the line periods. In one implementation, the assertion timing of the horizontal synchronization signal Hsync may be adjusted by horizontal blanking intervals (HBI). In implementations where the frame period duration is adjusted by adjusting the duration of the line periods, the emission pulse width control circuit 280 of the control circuitry 250 may be configured to detect the frame period duration based on the time intervals between successive assertions of the vertical synchronization signal Vsync.

Figure 7:
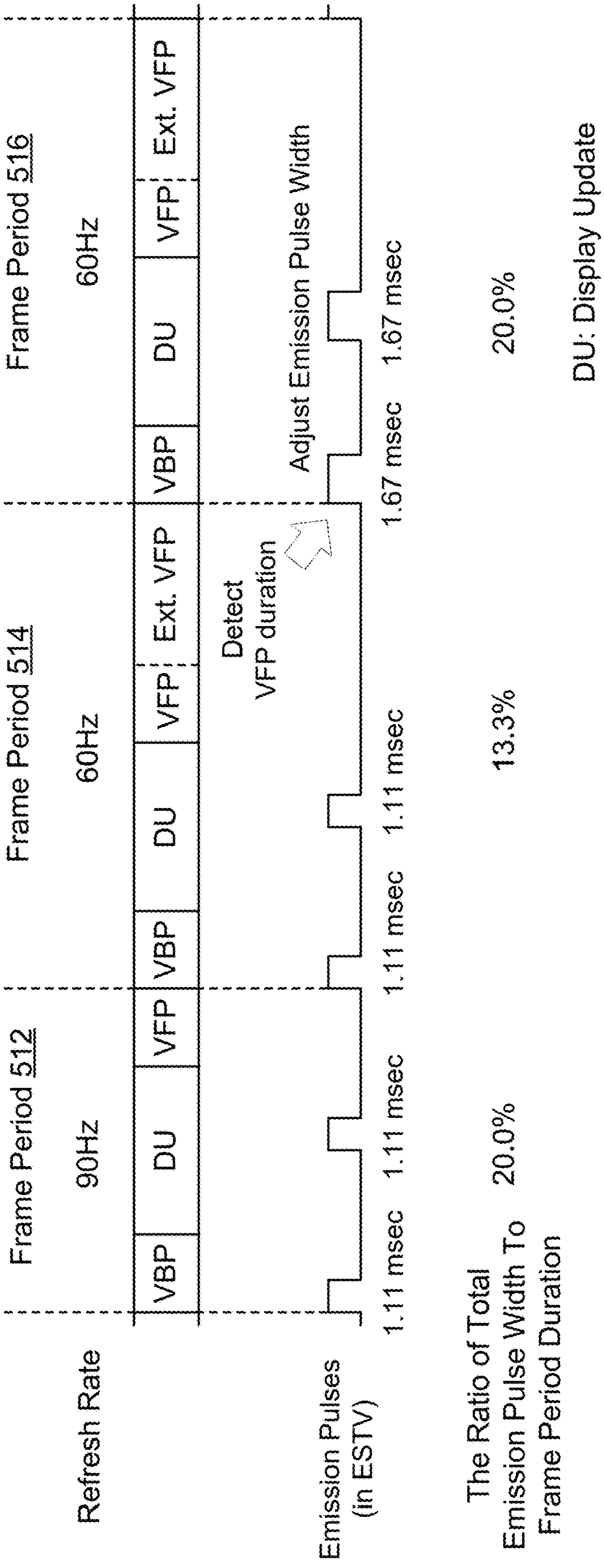
FIG. 7 shows another example of the operation of a display driver, according to one or more embodiments.

FIG. 7 shows another example of the operation of the display driver 200 during frame periods 512, 514, and 516, according to other embodiments. In the shown embodiment, two emission pulses occur during each of the frame periods 512, 514, and 516. It should be noted that three or more emission pulses may occur on the emission scan start pulse signal ESTV per frame period. The refresh rate is 90 Hz during the frame period 512, and the refresh rate is switched to 60 Hz in the frame period 514 by extending the duration of the frame period 514. In the shown embodiment, the duration of the frame period 514 is extended by extending the VFP period. The refresh rate is maintained at 60 Hz during the frame period 516, which follows the frame period 514.

In one or more embodiments, the control circuitry 250 of the display driver 200 (shown in FIG. 3) may be configured to detect the duration of the VFP period of the frame period 514, and to determine the emission pulse width for the frame period 516 based on the detected duration of the VFP period of the frame period 514. In alternative embodiments, the control circuitry 250 may be configured to detect the duration of the frame period 514 and to determine the emission pulse width for the frame period 516 based on the detected duration of the frame period 514. The panel interface circuitry 260 may be configured to generate the emission scan start pulse signal ESTV such that the emission pulses on the emission scan start pulse signal ESTV have the determined emission pulse width during the frame period 516. In one or more embodiments, to mitigate an undesired change in the display brightness level, the emission pulse width for the frame period 516 may be determined such that the light emission duty cycle during the frame period 516 is equal to the light emission duty cycle during the frame period 512, which occurs prior to the change in the frame period duration. This may be accomplished by determining the emission pulse width for the frame period 516 such that the ratio of the total emission pulse width to the frame period duration is unchanged between the frame periods 512 and 516. In the embodiment shown in FIG. 7, where the refresh rates during the frame periods 512 and 516 are 90 Hz and 60 Hz, respectively, and the emission pulse width during the frame period 512 is 1.11 msec, the emission pulse width for the frame period 516 is determined to be 1.67 msec such that the light emission duty cycle during the frame period 516 is equal to the light emission duty cycle during the frame period 512.

Figure 8:
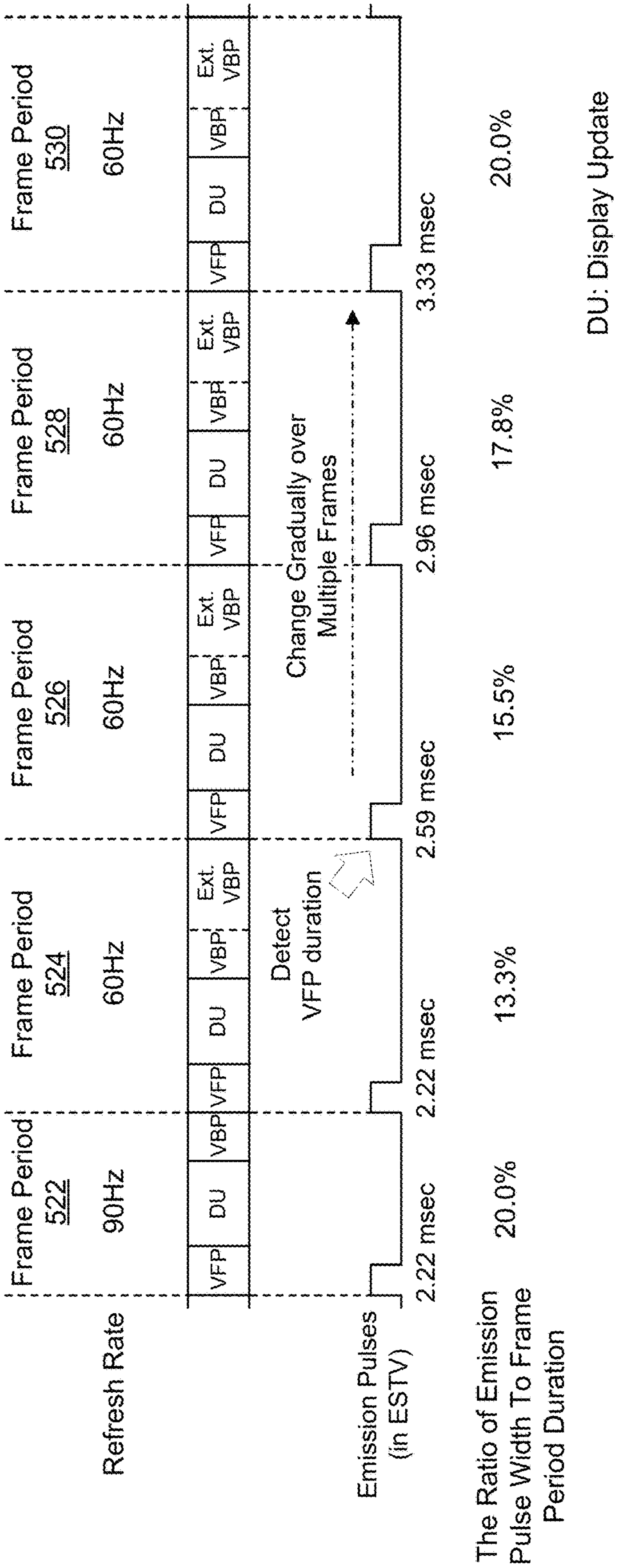
FIG. 8 shows another example of the operation of a display driver, according to one or more embodiments.

FIG. 8 shows yet another example of the operation of the display driver 200 during frame periods 522, 524, 526, 528, and 530, according to other embodiments. In the shown embodiment, one emission pulse occurs during each frame period. It should be noted that two or more emission pulses may occur on the emission scan start pulse signal ESTV per frame period. The refresh rate is 90 Hz during the frame period 522, and the refresh rate is switched to 60 Hz in the frame period 524 by extending the duration of the frame period 524. In the shown embodiment, the duration of the frame period 524 is extended by extending the VFP period. The refresh rate is maintained at 60 Hz during the frame periods 526, 528, and 530 that follows the frame period 524.

In one or more embodiments, the control circuitry 250 of the display driver 200 (shown in FIG. 3) may be configured to detect the duration of the VFP period of the frame period 524. In one implementation, the emission pulse width control circuit 280 of the control circuitry 250 may be configured to count the number of the line periods of the VFP period of the frame period 524 based on the horizontal synchronization signal Hsync received from the timing controller 270, and to detect the duration of the VFP period in terms of the number of the line periods of the VFP period.

The control circuitry 250 may be further configured to determine the emission pulse width for a particular frame period that occurs a predetermined number of frame periods after the change in the refresh rate based on the detected duration of the VFP period of the frame period 524. In the embodiment shown in FIG. 8, the control circuitry 250 may be further configured to determine the emission pulse width for the frame period 530, which is the fourth frame period after the change in the refresh rate, based on the detected duration of the VFP period of the frame period 524. In one or more embodiments, to mitigate an undesired change in the display brightness level, the emission pulse width for the frame period 530 may be determined such that the light emission duty cycle during the frame period 530 is equal to the light emission duty cycle during the frame period 522, which occurs before the change in the frame period duration. This may be accomplished by determining the emission pulse width for the frame period 530 such that the ratio of the emission pulse width to the frame period duration is unchanged between the frame periods 522 and 530.

The control circuitry 250 may further be configured to determine the emission pulse widths for the intervening frame periods 526 and 528 such that the determined emission pulse widths gradually approach the emission pulse width determined for the frame period 530 over time. More specifically, the control circuitry 250 may be configured to determine the emission pulse width for the frame period 526 such that the emission pulse width for the frame period 526 is a value between the emission pulse widths for the frame periods 522 and 530, and to determine the emission pulse width for the frame period 528 such that the emission pulse width for the frame period 528 is a value between the emission pulse widths for the frame periods 526 and 530. While there are two intervening frame periods in the embodiment shown in FIG. 8, three or more frames may occur between the frame periods 524 and 530. The control circuitry 250 may be configured such that the number of intervening frame periods between the frame periods 524 and 530 is configurable. The panel interface circuitry 260 may be configured to generate the emission scan start pulse signal ESTV such that the emission pulses on the emission scan start pulse signal ESTV have the emission pulse widths thus determined during the frame periods 526, 528, and 530. While a sudden change in the emission pulse width (e.g., as shown in FIG. 6) may in certain embodiments cause an artifact (e.g., flickering) in the displayed image, the occurrence of an undesirable artifact may be mitigated by gradually changing the emission pulse width as shown in FIG. 8.

In the embodiment shown in FIG. 8, in which the emission pulse width during the frame period 522 is 2.22 msec, the emission pulse width for the frame period 530 is determined to be 3.33 msec so that the light emission duty cycle during the frame period 530 is equal to the light emission duty cycle during the frame period 522. Further, the emission pulse widths for the frame periods 526 and 528 are determined to be 2.59 msec and 2.96 msec, respectively, to achieve gradual changes in the emission pulse width.

In other embodiments, the control circuitry 250 of the display driver 200 (shown in FIG. 3) may be configured to detect the duration of the frame period 524 instead of the duration of the duration of the VFP period of the frame period 524, and to determine the emission pulse widths for the frame periods 526, 528, and 530 based on the detected duration of the frame period 524. In one implementation, the emission pulse width control circuit 280 of the control circuitry 250 may be configured to count the number of the line periods of the frame period 524 based on the horizontal synchronization signal Hsync received from the timing controller 270, and to detect the duration of the frame period 524 in terms of the number of the line periods of the frame period 524. The control circuitry 250 may further be configured to determine the emission pulse width for the frame periods 526, 528, and 530 based on the detected duration of the frame period 524, and the panel interface circuitry 260 is configured to generate the emission scan start pulse signal ESTV such that the emission pulses on the emission scan start pulse signal ESTV have the determined emission pulse widths during the frame periods 526, 528, and 530.

Figure 9:
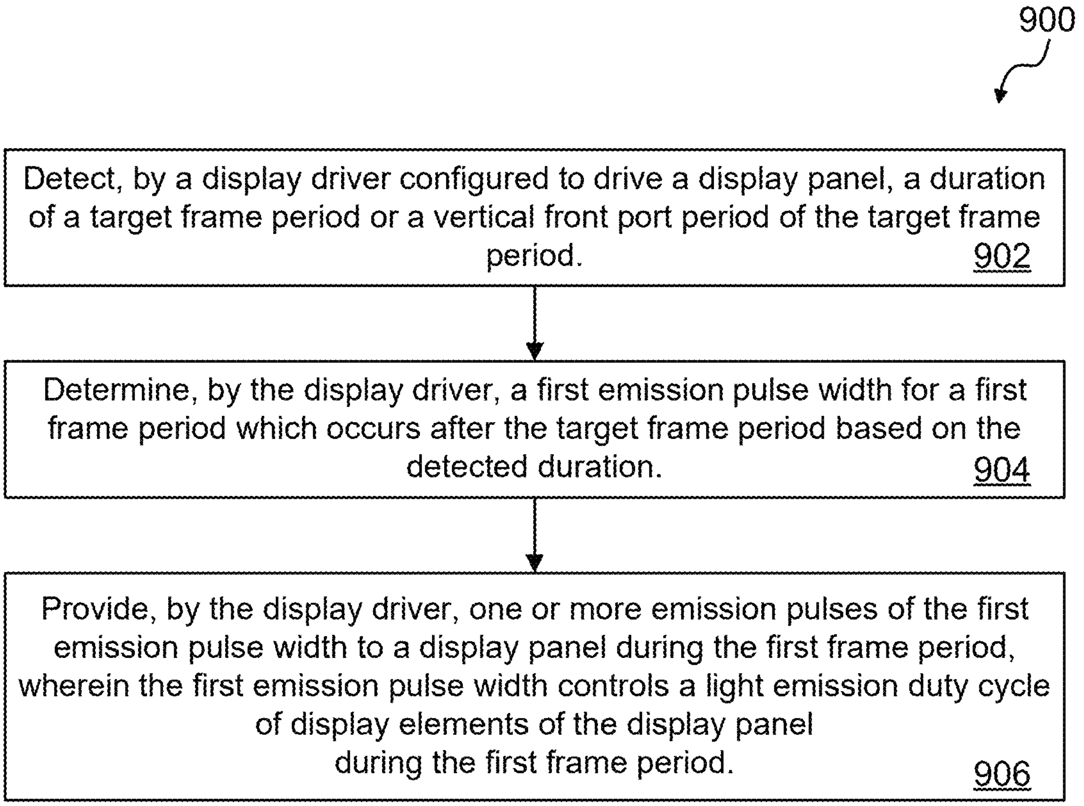
FIG. 9 is a flowchart of an exemplary process for adjusting the width of emission pulses, according to one or more embodiments.

FIG. 9 is a flowchart showing an exemplary process 900 for adjusting the emission pulse width, according to one or more embodiments. The process 900 may be performed by any suitable display device. Non-limiting examples include the display device 1000 shown in FIG. 1, particularly in the display driver 200 shown in FIG. 3. However, it will be appreciated that a display device having additional and/or fewer components, or a different configuration, than those shown in FIG. 1 may be used to perform the process 900, that any of the following steps may be performed in any suitable order, and that the process 900 may be performed in any suitable environment.

The process 900 includes detecting, by a display driver (e.g., the display driver 200 shown in FIGS. 1 and 3)

configured to drive a display panel (e.g. the display panel shown in FIG. 1), a duration of a target frame period (e.g., frame periods 504, 514, and 524 shown in FIGS. 6, 7, and 9) or a vertical front porch period of the target frame period in stage 902. The process 900 further includes, at stage 904, determining, by the display driver, a first emission pulse width for a first frame period (e.g., frame periods 506, 516, and 530 shown in FIGS. 6, 7, and 9) that occurs after the target frame period based on the detected duration. The process 900 further includes, at stage 906, providing, by the display driver, one or more emission pulses of the first emission pulse width to the display panel during the first frame period. The first emission pulse width controls a light emission duty cycle of display elements of a display panel during the first frame period. In implementations in which the duration of the vertical front porch period of the target frame period is detected, the first emission pulse width for the first frame period may be determined based on the duration of the vertical front porch period of the target frame period. The detection of the duration of the vertical front porch period of the target frame period may be performed by counting the number of line periods of the vertical front porch period of the target frame period.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display driver, comprising:

control circuitry configured to:

detect a duration of a target frame period or a vertical front porch period of the target frame period; and determine, based on the detected duration, a first emission pulse width for a first frame period which occurs after the target frame period; and panel interface circuitry configured to provide one or more emission pulses of the first emission pulse width to a display panel during the first frame period, wherein the first emission pulse width controls a light emission duty cycle of display elements of the display panel during the first frame period.

2. The display driver of claim 1, wherein the control circuitry is further configured to determine a second emission pulse width for a second frame period that occurs between the target frame period and the first frame period such that the second emission pulse width for the second frame period is a value between an emission pulse width for the target frame period and the first emission pulse width for the first frame period, and wherein the panel interface circuitry is further configured to provide one or more emission pulses of the second emission pulse width to the display panel during the second frame period.

3. The display driver of claim 1, wherein the control circuitry is further configured to determine respective emission pulse widths for a plurality of frame periods that occur between the target frame period and the first frame period such that the respective emission pulse widths for the plurality of frame periods gradually approach the first emission pulse width over time.

4. The display driver of claim 1, wherein the first emission pulse width is determined such that the light emission duty cycle of the display elements of the display panel during the first frame period is equal to a light emission duty cycle of the display elements of the display panel during a previous frame period that occurs before the target frame period.

5. The display driver of claim 1, wherein the detected duration is the duration of the vertical front porch period of the target frame period, and wherein the determining of the first emission pulse width for the first frame period is based on the duration of the vertical front porch period of the target frame period.

6. The display driver of claim 5, wherein the detecting of the duration of the vertical front porch period of the target frame period comprises counting a number of line periods of the vertical front porch period of the target frame period.

7. The display driver of claim 6, wherein the control circuitry is configured to generate a horizontal synchronization signal, and wherein the counting of the line periods of the vertical front porch period of the target frame period is based on the horizontal synchronization signal.

8. The display driver of claim 1, wherein the control circuitry is configured to detect the duration of the target frame period, wherein the control circuitry is configured to:

generate a vertical synchronization signal, and detect the duration of the target frame period based on the vertical synchronization signal.

9. The display driver of claim 1, wherein the display panel is an organic light emitting diode (OLED) display panel or a micro light emitting diode display panel.

10. A display device, comprising:

a display panel; and a display driver configured to:

detect a duration of a target frame period or a vertical front porch period of the target frame period;

determine, based on the detected duration, a first emission pulse width for a first frame period which occurs after the target frame period; and provide one or more emission pulses of the first emission pulse width to a display panel during the first frame period, wherein the first emission pulse width controls a light emission duty cycle of display elements of the display panel during the first frame period.

11. The display device of claim 10, wherein the display driver is further configured to:

determine a second emission pulse width for a second frame period that occurs between the target frame period and the first frame period such that the second emission pulse width for the second frame period is a value between an emission pulse width for the target frame period and the first emission pulse width for the first frame period; and provide one or more emission pulses of the second emission pulse width to the display panel during the second frame period.

12. The display device of claim 10, wherein the display driver is further configured to determine respective emission pulse widths for a plurality of frame periods that occur between the target frame period and the first frame period such that the respective emission pulse widths for the plurality of frame periods gradually approach the first emission pulse width over time.

13. The display device of claim 10, wherein the first emission pulse width is determined such that the light emission duty cycle of the display elements of the display panel during the first frame period is equal to a light emission duty cycle of the display elements of the display panel during a previous frame period that occurs before the target frame period.

14. The display device of claim 10, wherein the detected duration is the duration of the vertical front porch period of the target frame period, wherein the determining of the first emission pulse width for the first frame period is based on the duration of the vertical front porch period of the target frame period.

15. The display device of claim 14, wherein the detecting of the duration of the vertical front porch period of the target frame period comprises counting a number of line periods of the vertical front porch period of the target frame period.

16. The display device of claim 15, wherein the display driver is configured to generate a horizontal synchronization signal, and wherein the counting of the line periods of the vertical front porch period of the target frame period is based on the horizontal synchronization signal.

17. A method, comprising:

detecting, by a display driver configured to drive a display panel, a duration of a target frame period or a vertical front porch period of the target frame period; and determining, by the display driver, a first emission pulse width for a first frame period which occurs after the target frame period based on the detected duration; and providing, by the display driver, one or more emission pulses of the first emission pulse width to the display panel during the first frame period, wherein the first emission pulse width controls a light emission duty cycle of display elements of a display panel during the first frame period.

18. The method of claim 17, further comprising:

determining, by the display driver, a second emission pulse width for a second frame period that occurs between the target frame period and the first frame period such that the second emission pulse width for the second frame period is a value between an emission pulse width for the target frame period and the first emission pulse width for the first frame period; and providing, by the display driver, one or more emission pulses of the second emission pulse width to the display panel during the second frame period.

19. The method of claim 17, wherein the detected duration is the duration of the vertical front porch period of the target frame period, and wherein the determining of the first emission pulse width for the first frame period is based on the duration of the vertical front porch period of the target frame period.

20. The method of claim 19, wherein the detecting of the duration of the vertical front porch period of the target frame period comprises counting a number of line periods of the vertical front porch period of the target frame period.

* * * * *